(12) United States Patent
Yang

(10) Patent No.: US 11,607,298 B1
(45) Date of Patent: Mar. 21, 2023

(54) ELECTRIC TOOTHBRUSH

(71) Applicant: Shenzhen Sheng Dong Information Technology Co., Ltd., Shenzhen (CN)

(72) Inventor: Cheng Yang, Shenzhen (CN)

(73) Assignee: Shenzhen Sheng Dong Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/963,618

(22) Filed: Oct. 11, 2022

(51) Int. Cl.
| | |
|---|---|
| *A46B 15/00* | (2006.01) |
| *A61C 17/22* | (2006.01) |
| *H02J 50/00* | (2016.01) |
| *A46B 13/02* | (2006.01) |
| *A46B 17/00* | (2006.01) |
| *A46B 9/04* | (2006.01) |

(52) U.S. Cl.
CPC .............. *A61C 17/221* (2013.01); *A46B 9/04* (2013.01); *A46B 13/023* (2013.01); *A46B 15/0004* (2013.01); *A46B 15/0044* (2013.01); *A46B 17/00* (2013.01); *H02J 50/005* (2020.01)

(58) Field of Classification Search
CPC ............ A46B 15/0034; A46B 15/0036; A46B 15/0046; A61C 17/22
See application file for complete search history.

(56) References Cited

U.S. PATENT DOCUMENTS

| | | |
|---|---|---|
| 11,229,507 B1 | 1/2022 | Zhou |
| 2018/0110601 A1* | 4/2018 | Mighall .............. A61C 17/222 |
| 2019/0174909 A1 | 6/2019 | Huang |
| 2021/0322141 A1 | 10/2021 | He et al. |

FOREIGN PATENT DOCUMENTS

| | | | |
|---|---|---|---|
| CN | 214761558 U | * | 11/2021 |
| CN | 214967011 U | * | 12/2021 |
| CN | 215228702 U | * | 12/2021 |

* cited by examiner

*Primary Examiner* — Shay Karls
(74) *Attorney, Agent, or Firm* — Georgi Korobanov

(57) ABSTRACT

The present application discloses an electric toothbrush, which relates to the technical field of toiletries, and specifically comprises a body and a toothbrush head, wherein two through holes are integrally formed at an end of an end cover at the front of the body, and two groups of lamp beads are installed on the inner side of the end cover near the top through the lamp control circuit board. The toothbrush head is composed of a sleeve, a central main rod and a vibrator docking unit as a whole, wherein the central main rod and the vibrator docking unit are all made of PMMA high light-transmitting plastic by integral injection molding. The present application improves the design on the basic structure of the existing split-type electric toothbrush, so that it can realize the disinfection and sterilization of each dead corner of the toothbrush head.

10 Claims, 10 Drawing Sheets

ELECTRIC TOOTHBRUSH

TECHNICAL FIELD

The present application relates to the technical field of toiletries, in particular to an electric toothbrush.

BACKGROUND

Electric toothbrushes are a relatively well-known type of washing utensils in daily life. At present, the functions of split electric toothbrushes (the toothbrush head and the toothbrush host are detachable) are relatively simple, and they only have the basic functions of electric toothbrushes and do not have sterilization effects. Moreover, most of the sterilizable electric toothbrushes that have appeared at present have their sterilizing function relying on external supporting device components, such as "CN214761558U An electric toothbrush sterilizing cup and electric toothbrush sterilizing cup assembly", "CN214967011U A sterilizing electric toothbrush "and many more. And some few electric toothbrushes have their own disinfection components inside the body, but the final use is indeed after the external light is illuminated, and then the brush head cover reflects light from the outside to achieve external disinfection of the entire brush head, such as "CN215228702U A disinfection electric toothbrush." This external disinfection method is difficult to effectively disinfect the brush head docking position of the split electric toothbrush, the internal position of the docking part and the root position of the bristles, and these places also happen to be the places where bacteria are easy to breed. Therefore, the currently known disinfection methods for electric toothbrushes and the design of the disinfection structure for electric toothbrushes still have deficiencies.

At present, inside the brush head and brush rod of electric toothbrushes, after fixing the vibrator docking terminal, there is still a large void space inside. When the electric toothbrush is in use, these void spaces tend to generate a large oscillating sound when the brush head of the toothbrush vibrates at a high frequency, which leads to the expansion of the vibration noise when the electric toothbrush is in use, thereby affecting the user experience of consumers.

SUMMARY

In view of the deficiencies pointed out in the above background art, the present application provides an electric toothbrush.

An electric toothbrush of the present application comprises a body, a toothbrush head and a base. The difference from the body structure of the existing electric toothbrush is that two through holes are integrally formed at an end of an end cover at front end of the body. The through hole is mainly used to fit and install the two groups of lamp beads described below inside the end cap, so that the light can pass through the end cap, and a ring shaped lamp control circuit board is fixed on the inner side of the end cap near the top, and the back of the lamp control circuit board is electrically connected with two groups of lamp beads, one group is UV lamp beads, other group is LED white light lamp beads; each of the two groups of lamp beads corresponds to a through hole. Here, two groups of lamp beads with different functions are used, combined with the following two on and one off buttons and the lamp control circuit board, so that the end of the electric toothbrush body can be illuminated with incandescent lighting and ultraviolet light as required.

The toothbrush head is composed of a sleeve, a central main rod and a vibrator docking unit as a whole, the central main rod comprises a connecting rod part, and both ends of the connecting rod part are integrally formed with a brush head and a docking part, respectively. The sleeve comprises a pipe body, an interior of the pipe body is provided with an adapting cavity, the connecting rod part and the docking part of the central main rod and the vibrator docking unit are fixed in the adapting cavity, a front-end dimension structure inside the adapting cavity is designed to correspond to an outer dimension structure of the connecting rod part and the docking part in the central main rod and the two are fixed by adhesive in the form of a seamless bond, a dimension structure of the tail end of the adapting cavity is designed to correspond to an external dimension structure of the vibrator docking unit, and the vibrator docking unit is also seamlessly bonded by adhesive in the adapting cavity. In order to make the interior of the toothbrush head have the effect of light transmission, the whole central main rod and the vibrator docking unit are all made of PMMA high light-transmitting plastic by integral injection molding; the sleeve is made of opaque plastic as a whole.

Furthermore, in order to facilitate the use of the operator, in addition to the original button used to control the drive motor of the electric toothbrush to switch on and off, the body is also provided with a two-on and one-off button, which is configured to control the on and off of the two groups of lamp beads on the lamp control circuit board. It needs to be further explained that the lamp control circuit board is integrated with a timing circuit (not shown) to set the lighting time of the UV lamp beads, and the lamp control circuit board is electrically connected with the original power storage unit inside the body. The power storage unit inside the body of the electric toothbrush provides power for the lamp control circuit board and power for the lighting of the two groups of lamp beads.

Further, after structural improvement on the basis of the existing electric toothbrush body, in order to avoid water leakage of the improved end cover of the body, a rubber shell partition layer is also affixed on the back of the lamp control circuit board; a lamp housing is integrally formed at the positions of the rubber shell partition layer corresponding to the two groups of lamp beads respectively, the two lamp housings are respectively covered on a corresponding set of lamp beads, and the two lamp housings are tightly embedded in the through holes on the end cover and a waterproof rubber pad is also attached between the rubber shell partition layer and the end cover, and a sleeve hole is provided at the position of the waterproof rubber pad corresponding to the lamp housing.

Furthermore, in order to reduce the water entering the gap between the toothbrush head and the body as much as possible, and not affect the normal vibration of the toothbrush head, a ring groove is integrally formed on the outer side of the end cover. At the same time, a latex rubber band tube is also fixed on the end of the tube body of the sleeve, the middle part of the latex rubber band tube is configured as a corrugated tube, and a wall thickness of the middle part of the corrugated tube part of the latex rubber band tube is 0.8-1 mm, and a wall thickness at both ends of the latex rubber band tube is 1.5-1.8 mm, the structure of the pipe end of the latex rubber band tube and the ring groove on the end cover are configured to match each other.

Furthermore, the vibrator docking unit comprises an adapter seat, a vibrator fixing tube and a docking post, wherein the adapter seat, the vibrator fixing tube and the docking post are designed in one piece, the joints between the adapter seat, the vibrator fixing tube and the docking post are all designed as arc transitions, and an arc transition design is adopted between structures. Compared with the traditional corner angle design, the circular arc design can minimize the refraction and loss of light in the vibrator docking unit, and further improve the light transmission capacity of the vibrator docking unit. A plurality of positioning clip edges are integrally formed in the middle of the adapter seat in an annular manner, wherein the positioning clip edge is mainly used to position the vibrator docking unit when it is assembled with the adapting cavity inside the sleeve. The vibrator fixing tube is further sleeved with a rubber ferrule; a channel is provided at the center of the vibrator fixing tube and the adapter seat in the same axial direction, wherein the channel allows the vibrator of the body to pass through.

Further, in order to further improve the stability of the front and rear docking between the vibrator docking unit and the central main rod, and improve the effectiveness of vibration transmission between the two, the inner side of the docking part is also integrally formed with a docking socket adapted to the external dimensions of the docking post.

Further, in order to facilitate the removal of water stains in the bristles at the front end of the toothbrush head, a water permeable holes are formed in the middle of the brush head; a plurality of brush pores are further provided on one side of the brush head. At the same time, a water guide groove is opened on the pipe body of the sleeve, and a convex ring is integrally formed around the circumference on the pipe body at the end of the water guide groove.

Furthermore, the base comprises a wireless charging base and a silicone suction cup connected to the bottom of the wireless charging base, a strong permanent magnet is fixed at the center of the inner side of the silicone suction cup, a magnetic isolation sheet is provided inside the wireless charging stand at a position corresponding to the wireless charging coil and the strong permanent magnet therein, a positioning pile is arranged in a slot inside the wireless charging base, a matching socket is integrally formed at a position corresponding to the positioning pile at the bottom of the body; a wireless charging circuit board electrically connected to the wireless charging coil is further provided inside the wireless charging base; a power connection wire is connected to a power connection port of the wireless charging circuit board.

Furthermore, the adapter seat is designed in a conical shape, the surface of the adapter seat is further bonded with the first threaded casing by super glue; a circular convex edge is integrally formed on the bottom end of the adapter seat, the two sides of the convex edge are further provided with screwing force applying grooves, the outside of the adapter seat is further sleeved with a sealing rubber ring whose diameter is adapted to the diameter of the convex edge; the surface of the docking post is bonded with a second threaded casing by super glue, an inner wall of the rear end of the adapting cavity corresponding to the installation position of the adapter sea and the inner side of the docking socket are respectively provided with a threaded groove, which is matched with the first threaded sleeve and the second threaded sleeve for threaded connection.

Compared with the prior art, the beneficial effects of the present application are as follows:

The present application improves the design on the basic structure of the existing split-type electric toothbrush, so that it can realize the disinfection and sterilization of the dead corners of the toothbrush head. With the structural design of the entire toothbrush head, after the vibrator docking unit for docking the vibrator is docked and fixed with the sleeve, except for the jack channel reserved for docking the vibrator, the rest of the position constitutes a solid structure. In this aspect, the oscillating sound generated when the toothbrush head vibrates at a high frequency driven by the vibrator can be effectively reduced, and the noise of the toothbrush head can be reduced. On the other hand, since the vibration energy loss caused by the redundant cavity gap is reduced, the improved solid toothbrush head can further improve the vibration transmission efficiency.

BRIEF DESCRIPTION OF DRAWINGS

The drawings described herein are used to provide further understanding of the present application and constitute a part of the present application. The schematic embodiments and descriptions of the present application are used to explain the present application and do not constitute an improper limitation of the present application.

The Figures show.

REFERENCE SIGNS

Figure 1:
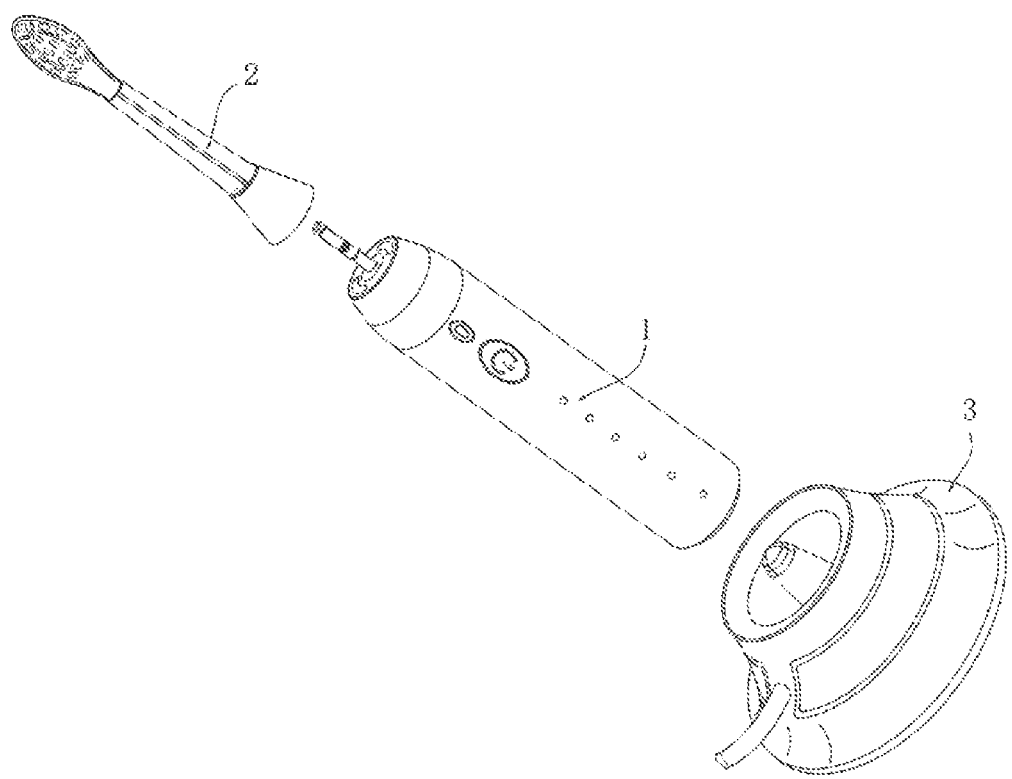
FIG. 1 is a schematic structural diagram of the present application.

1. Body; 101. End cover; 102. Two-on and one-off button; 103. Ring groove 104. Through hole; 105. Waterproof rubber pad; 106. Rubber shell partition layer; 107. Lamp housing; 108, Sleeve hole; 109, Ring shaped lamp control circuit board; 2, Toothbrush head; 201. Sleeve; 211. Pipe body-, 212. Adapting cavity; 213. Latex rubber band tube; 202. Central main rod; 221. Connecting rod part 222. Brush head; 223. Docking part t; 224. Water-permeable hole; 225. Brush hole; 226. Docking socket; 2261. Threaded groove; 203. Vibrator docking unit; 231. Adapter seat; 2311. Screwing force applying groove; 2312. First threaded casing, 2313. Sealing rubber ring; 232. Vibrator fixing tube; 233. Docking post; 2331. Second threaded casing; 234.

Positioning clip edge; 204. Rubber ferrule; 3. Base; 301. Wireless charging base; 302. Positioning pile; 303. Silicone suction cup; 304. Strong permanent magnet.

DETAILED DESCRIPTION

The following will disclose various embodiments of the present application by way of illustration, and for the sake of clarity, many physical details will be described together in the following description. It should be understood, however, that these physical details should not be used to limit the application. That is, in some embodiments of the present application, these physical details are unnecessary. In addition, to simplify the illustration, some conventional structures and components will be shown in a simple schematic manner in the drawings.

Embodiment 1

Figure 2:
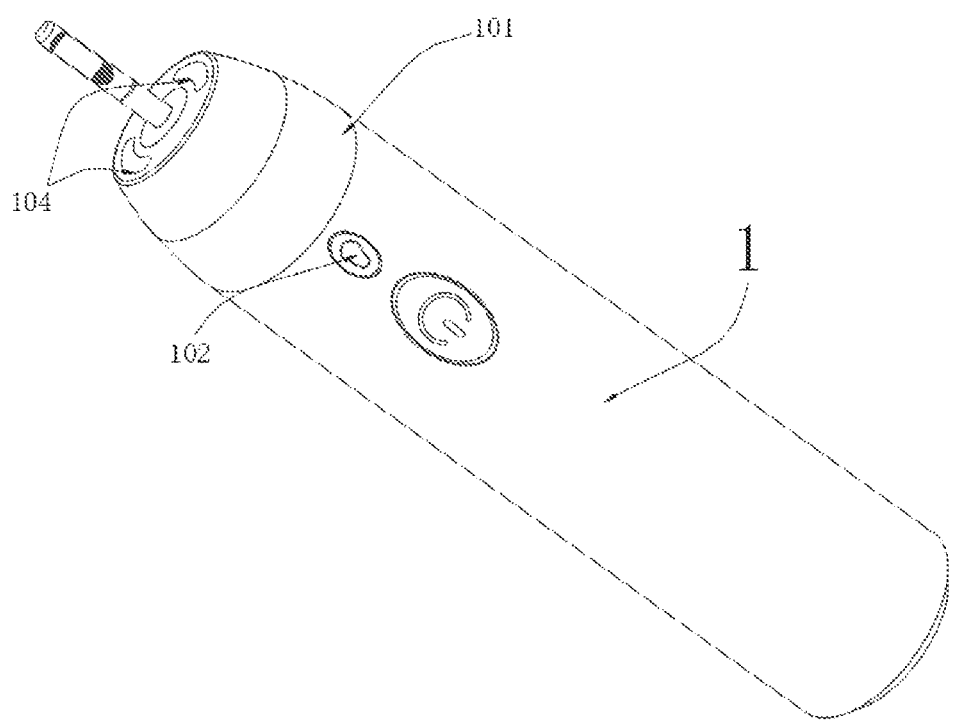
FIG. 2 is a schematic structural diagram of the body of the present application.
Figure 3:
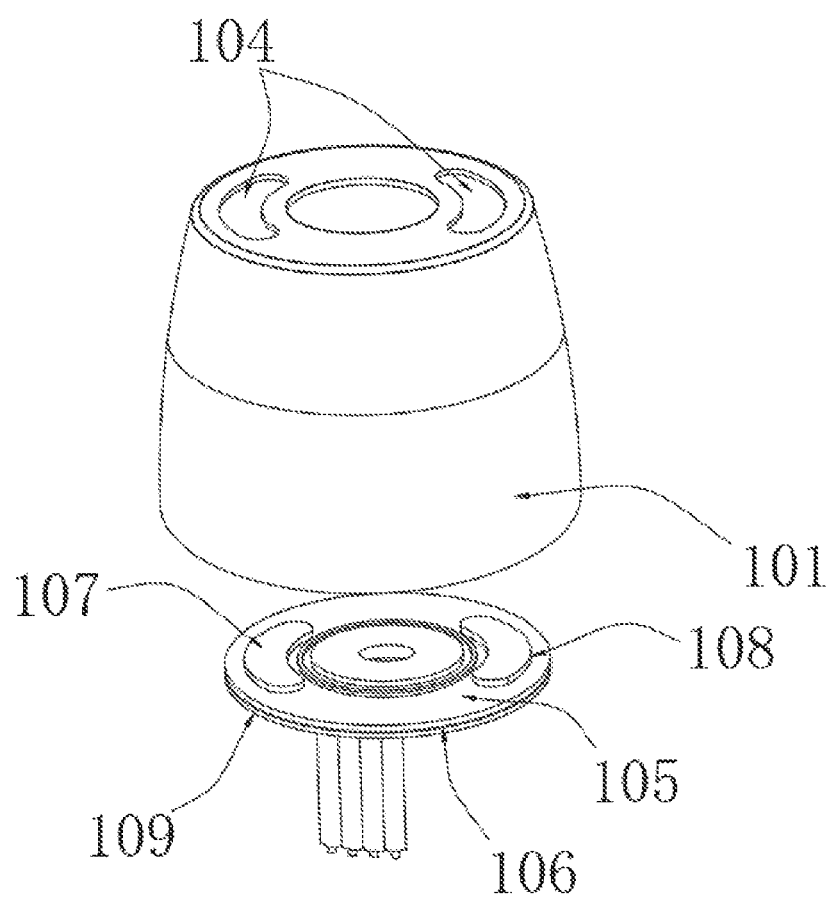
FIG. 3 is a schematic structural diagram of the end cap of the present application.

Please refer to FIGS. 1-3, an electric toothbrush of the present application comprises a body 1, a toothbrush head 2 and a base 3 using radio technology. Different from the structure of the body 1 of the existing electric toothbrush, two through holes 104 are integrally formed at the end of the end cover 101 at the front end of the body 1. The through holes 104 are mainly used to fit and install the following two groups of lamp beads inside the end cap 101, so that the light can pass through the end cap 101. A ring-shaped lamp control circuit board 109 is fixed on inner side of the end cover 101 near a top, and the back of the lamp control circuit board is electrically connected with two groups of lamp beads, one group is UV lamp beads, other group is LED white light lamp beads; each of the two groups of lamp beads corresponds to a through hole 104. Here, two groups of lamp beads with different functions are used, combined with the following two on and one off button 102 and the lamp control circuit board, so that the end of the electric toothbrush body 1 can be illuminated with incandescent lighting and ultraviolet light as required.

In this embodiment, in order to achieve the transmission of light inside the toothbrush head 2, and the overall structure of the toothbrush head 2 after the assembly is completed, except for the vibrator fixing tube 232 and the vibrator insertion channel reserved in the adapter seat 231, the rest of the all can form a solid structure. Therefore, a large amount of oscillating sound is reduced when the toothbrush head 2 vibrates, the noise of the electric toothbrush is reduced, and the effective transmission of vibration energy is improved.

Figure 4:
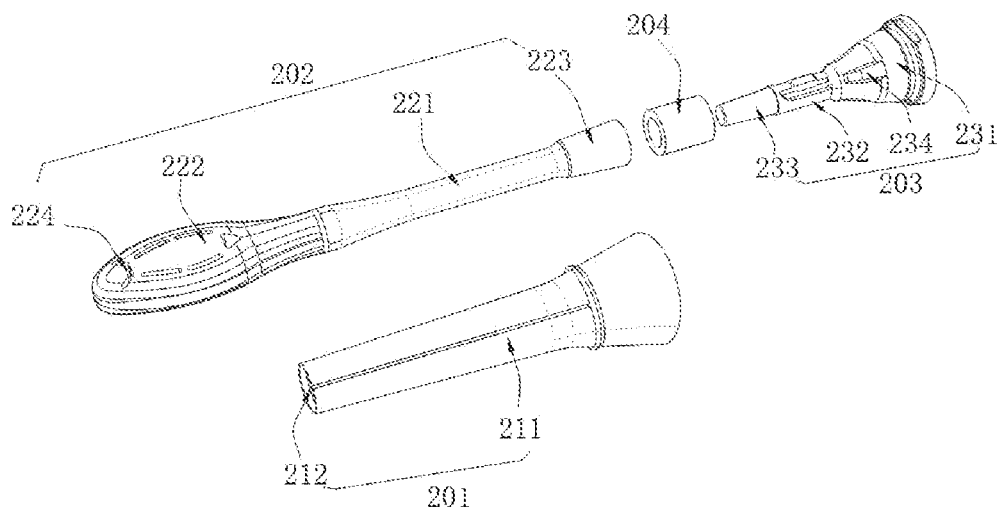
FIG. 4 is a schematic exploded structural diagram of the toothbrush head of the present application.
Figure 8:
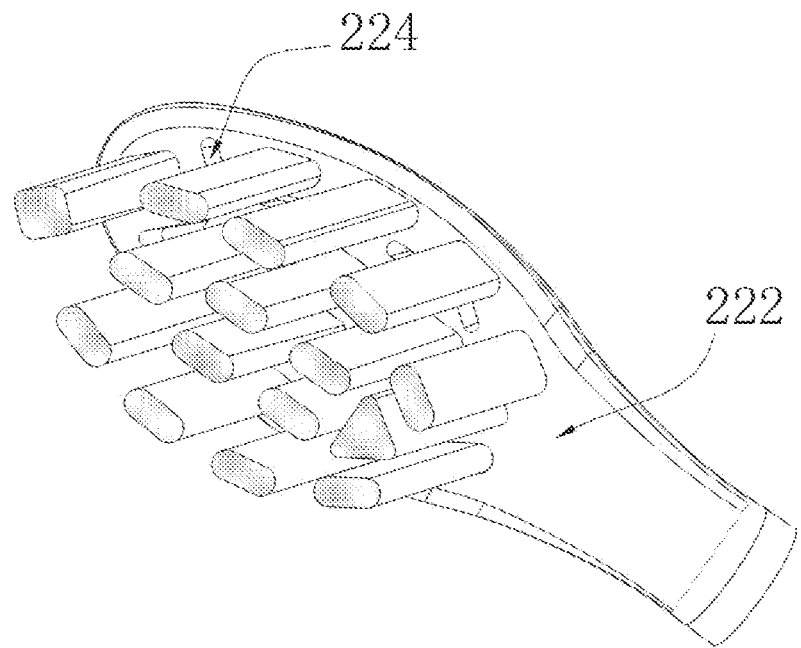
FIG. 8 is a schematic structural diagram of the brush head of the present application.
Figure 12:
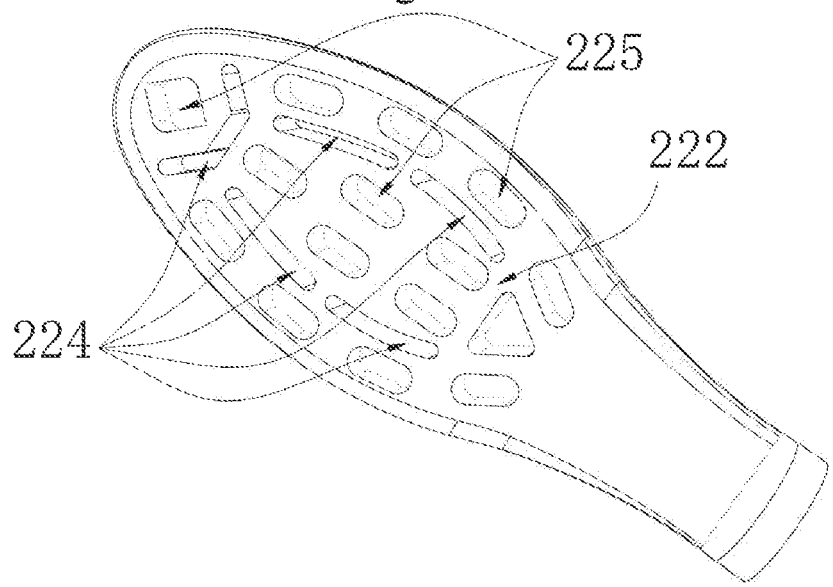
FIG. 12 is a schematic structural diagram of the brush head in the third embodiment of the present application.

For details, please refer to FIG. 4, FIG. 8, and FIG. 12, the toothbrush head 2 is composed of three parts: a sleeve 201, a central main rod 202 and a vibrator docking unit 203. The central main rod 202 further includes a connecting part 221, and a brush head 222 and a docking part 223 integrally formed on both ends of the connecting part 221. The one-piece design of the central main rod 221 can, on the one hand, make the inner front end of the toothbrush head 2 form a solid whole, reducing the loss of noise and vibration energy, and on the other hand, it can also contribute to the transmission of light. One side of the brush head 222 is also provided with a number of brush holes 225 for installing the bristles, and a water guide groove is also opened on the pipe body 211 of the sleeve 201 at the same time. A convex ring is integrally formed on the circumference of the pipe body 211 at the end of the water guide groove. The sleeve 201 comprises a pipe body 211, an interior of the pipe body 211 is provided with an adapting cavity 212, the connecting rod part 221 and the docking part 223 of the central main rod 202 and the vibrator docking unit 203 are fixed in the adapting cavity 212. A front-end dimension structure inside the adapting cavity 212 is designed to correspond to an outer dimension structure of the connecting rod part 221 and the docking part 223 in the central main rod 202 and the two are fixed by adhesive in the form of a seamless bond, a dimension structure of the tail end of the adapting cavity 212 is designed to correspond to an external dimension structure of the vibrator docking unit 203, and the vibrator docking unit 203 is also seamlessly bonded by adhesive in the adapting cavity 212. In order to make the interior of the toothbrush head 2 have the effect of light transmission, the whole central main rod 202 and the vibrator docking unit 203 are all made of PMMA high light-transmitting plastic by integral injection molding, the sleeve 201 is made of opaque plastic as a whole. The opaque design of the sleeve 201 can reduce the light loss when the light is transmitted inside the toothbrush head.

In this embodiment, please refer to FIG. 2, in order to facilitate the use of the operator, in addition to the original button used to control the drive motor of the electric toothbrush to switch on and off the body 1 is also provided with a two-on and one-off button 102, which is configured to control the on and off of the two groups of lamp beads on the lamp control circuit board. It needs to be further explained that the lamp control circuit board is integrated with a timing circuit (not shown) to set the lighting time of the UV lamp beads, and the lamp control circuit board is electrically connected with the original power storage unit inside the body. The power storage unit inside the body 1 of the electric toothbrush provides power for the lamp control circuit board and power for the lighting of the two groups of lamp beads.

In this embodiment, please refer to FIG. 3, after structural improvement on the basis of the existing electric toothbrush body 1, in order to avoid water leakage of the improved end cover 101 of the body 1, a rubber shell partition layer 106 is also affixed on the back of the lamp control circuit board; a lamp housing 107 is integrally formed at the positions of the rubber shell partition layer 106 corresponding to the two groups of lamp beads respectively, the two lamp housings 107 are respectively covered on a corresponding set of lamp beads, and the two lamp housings 107 are tightly embedded in the through holes 104 on the end cover 101 and a waterproof rubber pad 105 is also attached between the rubber shell partition layer 106 and the end cover 101, and a sleeve hole 108 is provided at the position of the waterproof rubber pad 105 corresponding to the lamp housing 107, so that the waterproof rubber pad can achieve the positioning effect on the rubber shell partition layer.

In this embodiment, please refer to FIG. 4, the vibrator docking unit 203 comprises an adapter seat 231, a vibrator fixing tube 232 and a docking post 233, wherein the adapter seat 231, the vibrator fixing tube 232 and the docking post 233 are designed in one piece, the joints between the adapter seat 231, the vibrator fixing tube 232 and the docking post 233 are all designed as arc transitions, and an arc transition design is adopted between structures. Compared with the traditional corner angle design, the circular arc design can minimize the refraction and loss of light in the vibrator docking unit 203, and further improve the light transmission capacity of the vibrator docking unit 203. A plurality of positioning clip edges 234 are integrally formed in the middle of the adapter seat 231 in an annular manner, wherein the positioning clip edge 234 is mainly used to position the vibrator docking unit 203 when it is assembled with the adapting cavity 212 inside the sleeve 201. The vibrator fixing tube 232 is further sleeved with a rubber ferrule 204. In use, the rubber ferrule 204 is sleeved on the vibrator fixing tube 232, and with the assembly of the vibrator docking unit 203, the entire rubber ferrule 204 is fixed into the adapting cavity 212, and applies pressure on the lock tongue on the vibrator fixing tube 232 inward. Combined with the elastic deformation effect of the rubber ferrule 204 itself, it can effectively fix the vibrator on the body 1 of the electric toothbrush without affecting the disassembly of the toothbrush head 2 and the body 1. A channel is provided at the center of the vibrator fixing tube and the adapter seat in the same axial direction, wherein the channel allows the vibrator of the body to pass through, so as to facilitate the insertion and installation of the toothbrush head 2 and the vibrator on the body 1.

Figure 5:
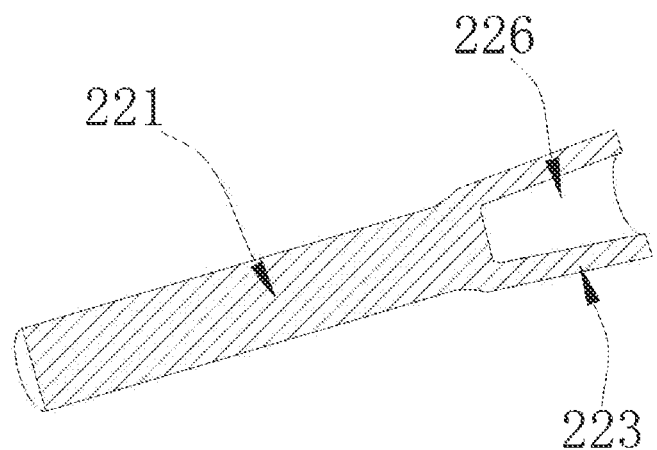
FIG. 5 is a schematic diagram of the cross-sectional structure of the connecting rod part of the present application.

In this embodiment, refer to FIGS. 4-5, in order to further improve the stability of the front and rear docking between the vibrator docking unit and the central main rod 202, and improve the effectiveness of vibration transmission between the two, the inner side of the docking part 223 is also integrally formed with a docking socket 226 adapted to the external dimensions of the docking post 223. When the UV lamp set for disinfection is turned on, its light enters at the end of the vibrator docking unit 203 and is refracted inside, and then exits from the other end into the connecting rod part 221 and is transmitted to the brush head 222 from the end of the connecting rod part 221, so that the brush head 222 is illuminated with ultraviolet light. During the transmission process of the light, a part of the light loss is scattered at the connection of the special-shaped structure of the vibrator docking unit 203. The scattered part of the ultraviolet light is used to perform ultraviolet sterilization and disinfection on the gap inside the entire vibrator docking unit 203, while the other part of the ultraviolet light is transmitted to the central main rod 202 after final refraction. Since the sleeve 201 in the entire toothbrush head 2 is made of conventional opaque plastics, the sleeve 201 itself has strong light-blocking properties, so the light entering the toothbrush head 2 can only be refracted and conducted in the high-transparency plastic inside the toothbrush head 2 in the end, so as to ensure that sufficient light can finally be transmitted to the brush head 222.

Figure 6:
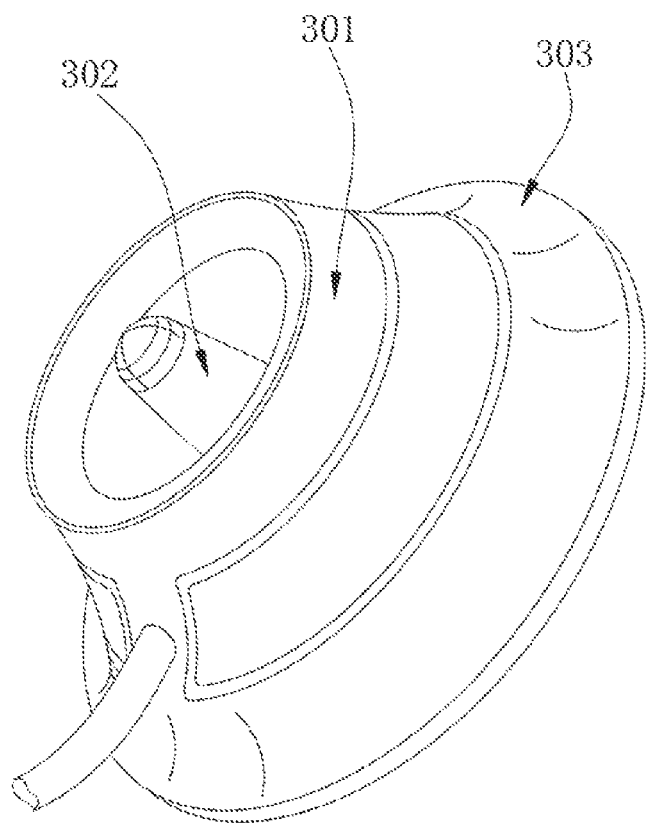
FIG. 6 is a schematic structural diagram of the base of the present application.
Figure 7:
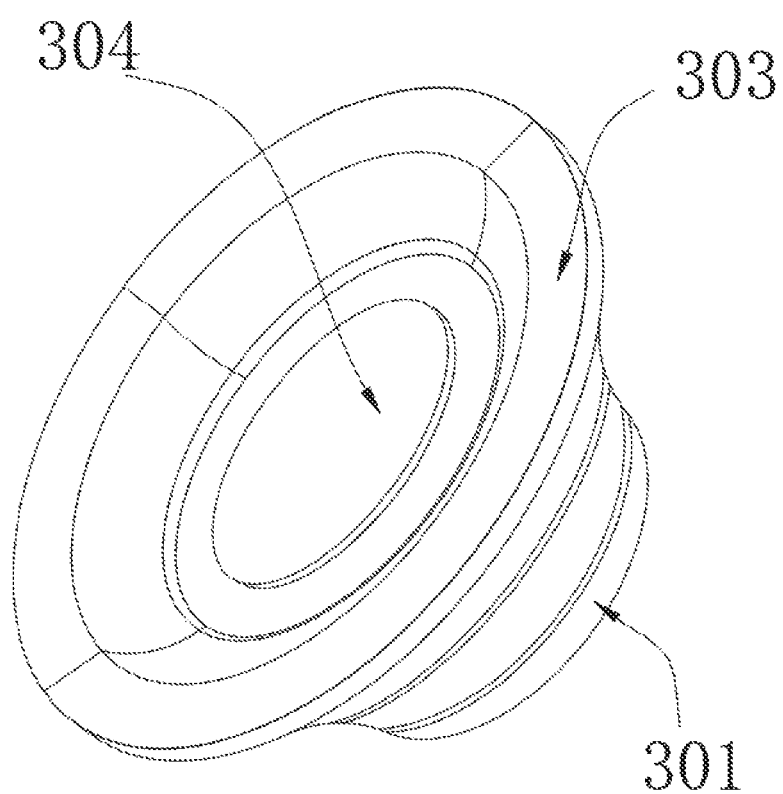
FIG. 7 is a schematic structural diagram of the bottom the base of the present application.

Please refer to FIGS. 6 and 7, in order to facilitate the fixing of the base 3 when it is placed, the base 3 comprises a wireless charging base 301 and a silicone suction cup 303 connected to the bottom of the wireless charging base 301, a strong permanent magnet 304 is fixed at the center of the inner side of the silicone suction cup 303. The silicone suction cup 303 and the strong permanent magnet 304 can effectively place the base 3 in different positions, which can expand its scope of application and provide convenience for consumers to use. In order to prevent the magnetic field of the strong permanent magnet 304 from interfering with the magnetic field of the wireless charging coil, magnetic isolation sheet is provided inside the wireless charging base 301 at the position corresponding to the wireless charging coil and the strong permanent magnet 304 in the wireless charging base 301. A positioning pile 302 is arranged in a slot inside the wireless charging base 301, a matching socket is integrally formed at a position corresponding to the positioning pile 302 at the bottom of the body 1; a wireless charging circuit board electrically connected to the wireless charging coil is further provided inside the wireless charging base 301; a power connection wire is connected to a power connection port of the wireless charging circuit board.

The vibrator docking unit 203 and the central main rod are made of high light-transmitting PMMA plastic, so that both the vibrator docking unit 203 and the central main rod 202 have extremely high light transmission and light transmission characteristics. Due to the design of the high light-transmitting vibrator docking unit 203, the light emitted by the UV lamp bead assembly can be smoothly transmitted from the end of the vibrator docking unit 203 to the inner corners of the entire vibrator docking unit 203, so as to carry out disinfection and sterilization without dead angle in its internal gap. Combined with the adaptation design between the front end of the vibrator docking unit 203 and the central main rod 202, and also with the high light transmission design of the central main rod 202, the central main rod 202 can build a light transmission path with the front end of the vibrator docking unit 203, so that the ultraviolet rays can be smoothly transmitted from the connecting rod part 221 inside the toothbrush head 2 to the brush head 222, and the ultraviolet rays can be sterilized from the inside to the outside from the root of the toothbrush bristles. Compared with the current external sterilization, its sterilization effect is more thorough. The central main rod 202 and the vibrator docking unit 203 are fitted with the fitting cavity 212 inside the sleeve 201 and are fixedly assembled. In this way, for the traditional hollow brush head structure, the vibration sound produced is smaller, and there is no redundant space to weaken the transmission of vibration energy, thereby improving the transmission of vibration energy.

Embodiment 2

Figure 9:
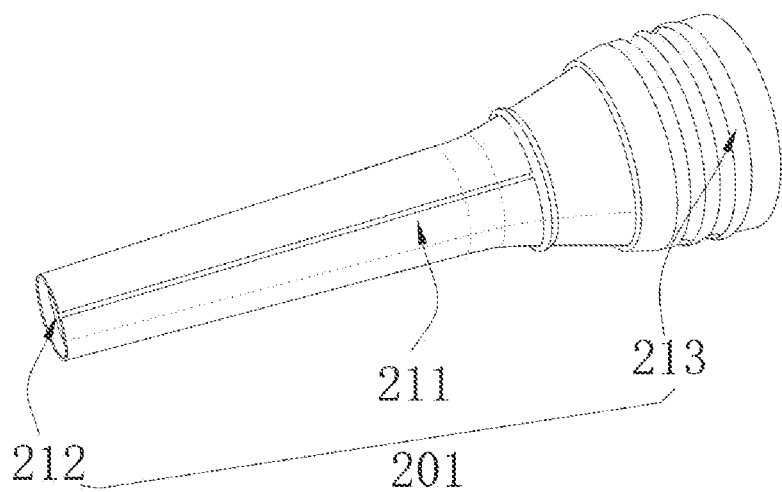
FIG. 9 is a schematic structural diagram of the sleeve in the first embodiment of the present application.
Figure 10:
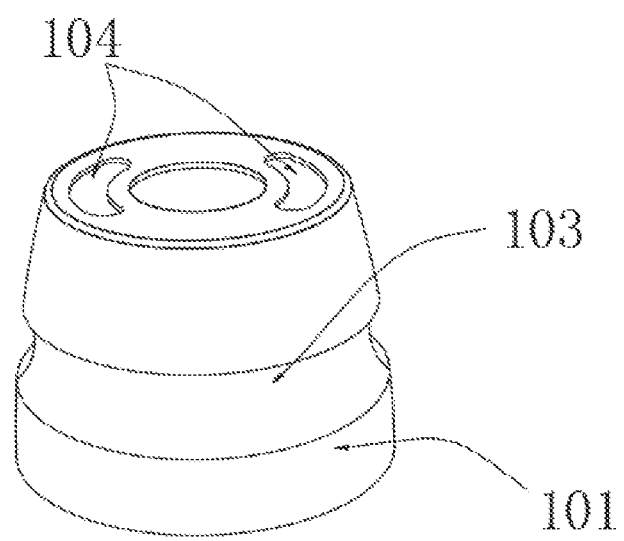
FIG. 10 is a schematic structural diagram of the housing of the end cap in the second embodiment of the present application.
Figure 11:
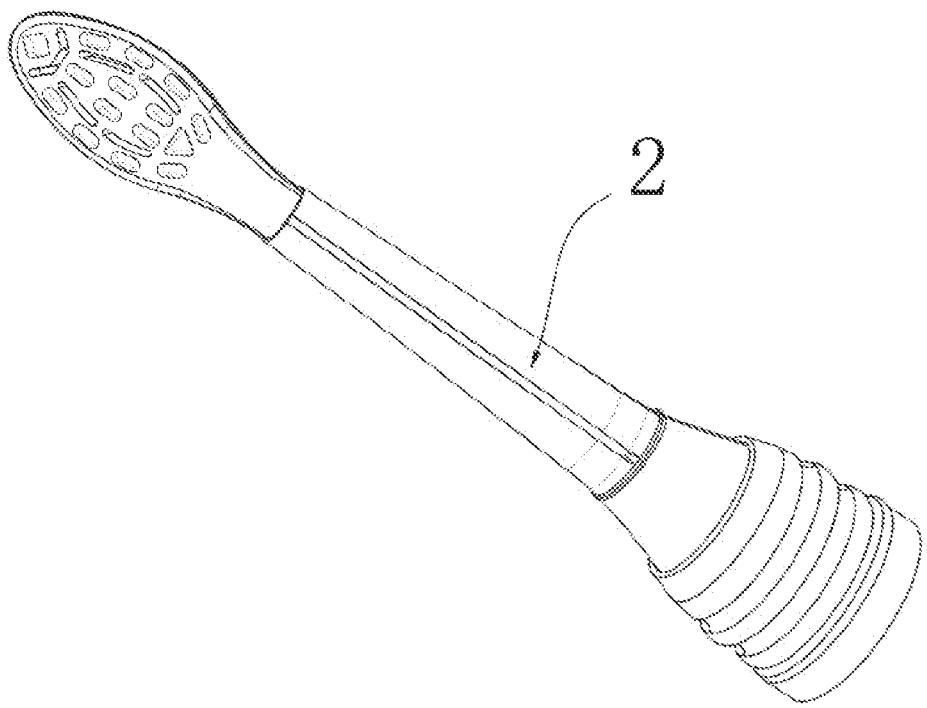
FIG. 11 is a schematic structural diagram of the toothbrush head in the second embodiment of the present application.

The difference from the embodiment 1 is: please refer to FIGS. 9-11, in order to minimize the water entering the gap between the toothbrush head 2 and the body 1 without affecting the normal vibration of the toothbrush head 2, a ring groove 103 is integrally formed on the outer side of the end cover 101. At the same time, a latex rubber band tube 213 is also fixed on the end of the tube body 211 of the sleeve 201, the middle part of the latex rubber band tube 213 is configured as a corrugated tube, and a wall thickness of the middle part of the corrugated tube part of the latex rubber band tube 213 is 0.8-1 mm, and a wall thickness at both ends of the latex rubber band tube 213 is 1.5-1.8 mm, the structure of the pipe end of the latex rubber band tube 213 and the ring groove 103 on the end cover 101 are configured to match each other. As we all know, the gap between the toothbrush head 2 of the split electric toothbrush and the end of the body 1 is basically within 1 mm, which is mainly used to facilitate the vibration of the toothbrush head 2 and prevent the body 1 from hindering the vibration of the toothbrush head 2. The design of the latex rubber band tube 213, according to the relatively soft structural characteristics of the latex rubber band tube 213 (i.e.: rubber band hose), can maximally prevent the installation of the latex rubber band tube 213 from affecting the vibration of the toothbrush head 2, and also can play a good waterproof effect. Combined with the latex rubber band tube 213 itself is an elastic structure, and its disassembly, assembly and cleaning are extremely convenient.

Embodiment 3

Please refer to FIG. 12, in order to facilitate the removal of water stains in the bristles at the front end of the toothbrush head 2, on the basis of the existing toothbrush head, water permeable holes 224 are opened in the middle of the brush head 222. Compared with the traditional toothbrush head, the water permeable hole can make the brush head have good air permeability, and can accelerate the evaporation of residual water stains.

Embodiment 4

As we all know, at present, whether it is an ordinary toothbrush or an electric toothbrush, the most easily damaged position is the bristles of the brush head, and the service life of the part of the vibrator docking unit 203 is much longer than that of the bristles. In the currently known brush head structure on electric toothbrushes, a one-time fixed non-removable bonding structure is used between the vibrator docking unit 203 and the rod of the toothbrush head 2. Every time the toothbrush head 2 is replaced, it should be replaced together with the entire toothbrush rod and the toothbrush head 2 (Some toothbrush heads that can replace the bristles alone, because the electric toothbrush uses high-frequency vibration cleaning teeth, the structure of this toothbrush head will be loose or detached during long-term high-frequency vibration. Therefore, this kind of toothbrush head with separate bristles is not widely used in the application field of electric toothbrushes), which will cause unnecessary waste of resources.

Figure 13:
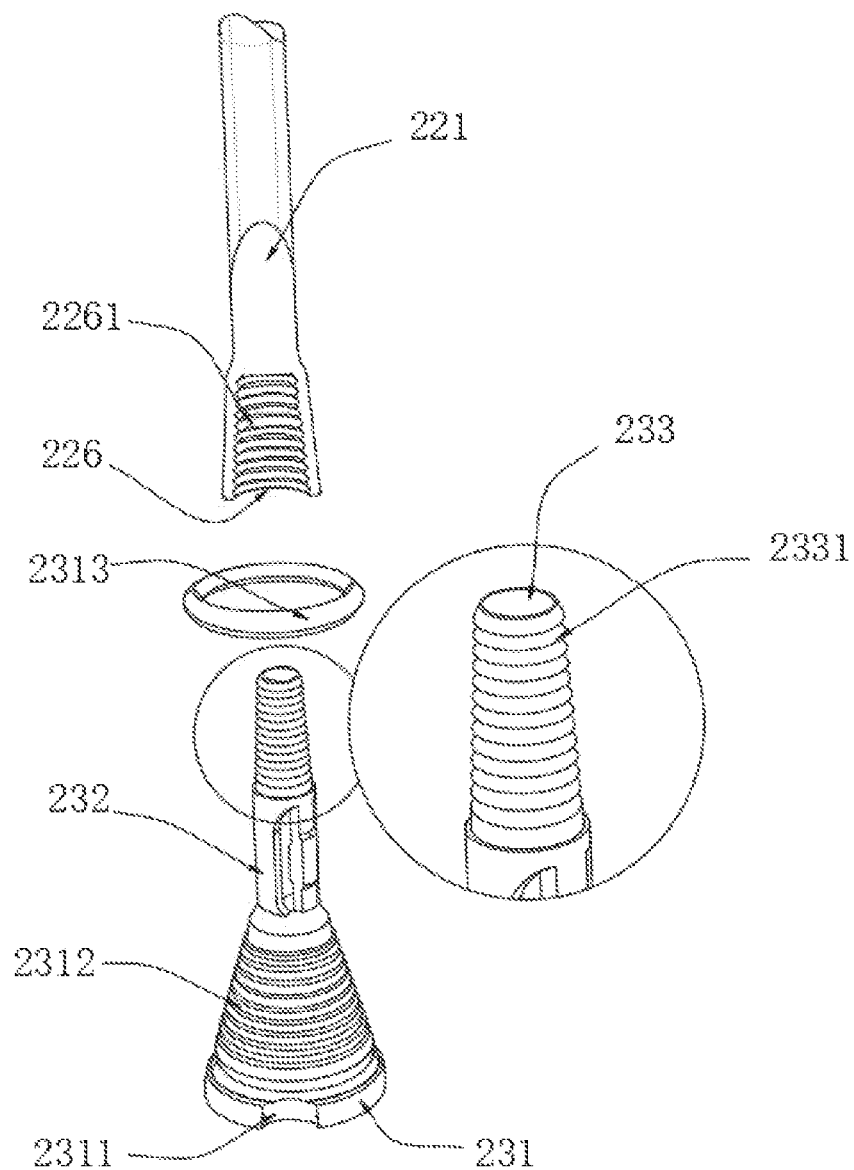
FIG. 13 is a schematic structural diagram of a vibrator docking unit in the fourth embodiment of the present application.

In order to solve this problem, in this embodiment, please refer to FIG. 13. The difference from the embodiment 1 is that the detachable installation method of screw connection is adopted between the vibrator docking unit 203 and the sleeve 201.

Specifically, the adapter seat 231 in the vibrator docking unit 203 is designed in a conical shape, the surface of the adapter seat 231 is further bonded with a first threaded casing 2312 by super glue. A circular convex edge is integrally formed on the bottom end of the adapter seat 231, the two sides of the convex edge are further provided with screwing force applying grooves 2311, the outside of the adapter seat 231 is further sleeved with a sealing rubber ring 2313 whose diameter is adapted to the diameter of the convex edge; the surface of the docking post 233 is bonded with a second threaded casing 2331 by super glue, an inner wall of the rear end of the adapting cavity 212 corresponding to the installation position of the adapter seat 231 and the inner side of the docking socket 226 are respectively provided with a threaded groove 2261, which is matched with the first threaded sleeve 2312 and the second threaded sleeve 2331 for threaded connection.

In this embodiment, compared with the embodiment 1, an auxiliary tool (not shown) for installing and removing the vibrator docking unit 203 is also included. The auxiliary tool is composed of a stainless-steel metal disc with a thickness of 1 mm. One gripping tooth is integrally formed on both sides of one side of the metal disc corresponding to the positions of the two screwing force applying grooves 2311 on the adapter seat 231. The back of the metal disc is integrally formed with a notch that fits with the end of the screwdriver. When installing and dismounting the vibrator docking unit 203, it is only necessary to engage the gripping teeth on the auxiliary tool with the screwing force applying grooves 2311 on the adapter seat 231, and use a screwdriver to perform a screwing operation through the grooves.

The vibrator docking unit 203 in the toothbrush head 2 and the rest of the toothbrush head 2 are divided into two wholes to be sold separately or in combination by adopting the installation method of threaded detachable connection. According to the difference in service life between the bristles and the vibrator docking unit 203, the replacement ratio of the parts with bristles will be much higher than that of the vibrator docking unit 203, so the production cost of some products of the toothbrush head 2 can be greatly reduced. Secondly, the damaged parts can be replaced in a targeted manner, which can avoid unnecessary waste of resources.

The above descriptions are merely embodiments of the present application, and are not intended to limit the present application. Various modifications and variations of this application are possible for those skilled in the art. Any modification, equivalent replacement, improvement, etc. made within the spirit and principle of the present application shall be included within the scope of the claims of the present application.

What is claimed is:

1. An electric toothbrush, comprising a body (1), a toothbrush head (2) and a base (3), wherein two through holes (104) are integrally formed at an end of an end cover (101) at front end of the body (1), a ring-shaped lamp control circuit board (109) is fixed on inner side of the end cover (101) near a top, and the back of the lamp control circuit board is electrically connected with two groups of lamp beads, one group is UV lamp beads, other group is LED white light lamp beads; each of the two groups of lamp beads corresponds to a through hole (104);

the toothbrush head (2) is composed of a sleeve (201), a central main rod (202) and a vibrator docking unit (203) as a whole, the central main rod (202) comprises a connecting rod part (221), and both ends of the connecting rod part (221) are integrally formed with a brush head (222) and a docking part (223), respectively, the sleeve (201) comprises a pipe body (211), an interior of the pipe body (211) is provided with an adapting cavity (212), the connecting rod part (221) and the docking part (223) of the central main rod (202) and the vibrator docking unit (203) are fixed in the adapting cavity (212); the entire central main rod (202) and the vibrator docking unit (203) are all made of PMMA high light-transmitting plastic by integral injection molding.

2. The electric toothbrush according to claim 1, wherein in addition to the original button used to control the drive motor of the electric toothbrush to switch on and off, the body (1) is also provided with a two-on and one-off button (102), which is configured to control the on and off of the two groups of lamp beads on the lamp control circuit board, and the lamp control circuit board is electrically connected to the power storage unit originally built in the body (1).

3. The electric toothbrush according to claim 1, wherein the back of the lamp control circuit board is further affixed with a rubber shell partition layer (106); a lamp housing (107) is integrally formed at the positions of the rubber shell partition layer (106) corresponding to the two groups of lamp beads respectively, the two lamp housings (107) are respectively covered on a corresponding set of lamp beads, and the two lamp housings (107) are tightly embedded in the through holes (104) on the end cover (101), and a waterproof rubber pad (105) is also attached between the rubber shell partition layer (106) and the end cover (101), and a sleeve hole (108) is provided at the position of the waterproof rubber pad (105) corresponding to the lamp housing (107).

4. The electric toothbrush according to claim 1, wherein a ring groove (103) is integrally formed on the outer side of the end cover (101), a tail end of the pipe body (211) of the sleeve (201) is fixedly sleeved with a latex rubber band tube (213), the middle part of the latex rubber band tube (213) is configured as a corrugated tube, and a wall thickness of the middle part of the corrugated tube part of the latex rubber band tube (213) is 0.8-1 mm, and a wall thickness at both ends of the latex rubber band tube (213) is 1.5-1.8 mm, the structure of the pipe end of the latex rubber band tube (213) and the ring groove (103) on the end cover (101) are configured to match each other, and the sleeve (201) is made of opaque plastic as a whole.

5. The electric toothbrush according to claim 1, wherein a front-end dimension structure inside the adapting cavity (212) is designed to correspond to an outer dimension structure of the connecting rod part (221) and the docking part (223) in the central main rod (202) and the two are fixed by adhesive in the form of a seamless bond, a dimension structure of the tail end of the adapting cavity (212) is designed to correspond to an external dimension structure of the vibrator docking unit (203), and the vibrator docking unit (203) is also seamlessly bonded by adhesive in the adapting cavity (212).

6. The electric toothbrush according to claim 1, wherein the vibrator docking unit (203) comprises an adapter seat (231), a vibrator fixing tube (232) and a docking post (233), wherein the adapter seat (231), the vibrator fixing tube (232) and the docking post (233) are designed in one piece, the joints between the adapter seat (231), the vibrator fixing tube (232) and the docking post (233) are all designed as arc transitions, a plurality of positioning clip edges (234) are integrally formed in the middle of the adapter seat (231) in an annular manner, the vibrator fixing tube (232) is further sleeved with a rubber ferrule (204); a channel is provided at the center of the vibrator fixing tube (232) and the adapter seat (231) in the same axial direction, wherein the channel allows the vibrator of the body (1) to pass through.

7. The electric toothbrush according to claim 6, wherein the adapter seat (231) is designed in a conical shape, the surface of the adapter seat (231) is further bonded with a first threaded casing (2312) by super glue; a circular convex edge is integrally formed on the bottom end of the adapter seat (231), the two sides of the convex edge are further provided with screwing force applying grooves (2311), the outside of the adapter seat (231) is further sleeved with a sealing rubber ring (2313) whose diameter is adapted to the diameter of the convex edge; the surface of the docking post (233) is bonded with a second threaded casing (2331) by super glue, an inner wall of the rear end of the adapting cavity (212) corresponding to the installation position of the adapter seat (231) and the inner side of the docking socket (226) are respectively provided with a threaded groove (2261), which is matched with the first threaded sleeve (2312) and the second threaded sleeve (2331) for threaded connection.

8. The electric toothbrush according to claim 1, wherein an inner side of the docking part (223) is further integrally formed with a docking socket (226) adapted to the external dimensions of the docking post (233).

9. The electric toothbrush according to claim 1, wherein a water-permeable holes (224) are formed in the middle of the brush head (222); a plurality of brush pores (225) are further provided on one side of the brush head (222).

10. The electric toothbrush according to claim 1, wherein the base (3) comprises a wireless charging base (301) and a silicone suction cup (303) connected to the bottom of the wireless charging base (301), a strong permanent magnet (304) is fixed at the center of the inner side of the silicone suction cup (303), a magnetic isolation sheet is provided inside the wireless charging stand (301) at a position corresponding to the wireless charging coil and the strong permanent magnet (304) therein, a positioning pile (302) is arranged in a slot inside the wireless charging base (301), a matching socket is integrally formed at a position corresponding to the positioning pile (302) at the bottom of the body (1); a wireless charging circuit board electrically connected to the wireless charging coil is further provided inside the wireless charging base (301); a power connection wire is connected to a power connection port of the wireless charging circuit board.

\* \* \* \* \*